United States Patent [19]

Edwards

[11] Patent Number: 5,091,637
[45] Date of Patent: Feb. 25, 1992

[54] NOISE REDUCING INFRARED RETICLE/DETECTOR ARRANGEMENT

[75] Inventor: Byron Edwards, Orange, Calif.

[73] Assignee: Loral Aerospace Corp., New York, N.Y.

[21] Appl. No.: 539,778

[22] Filed: Jun. 18, 1990

Related U.S. Application Data

[63] Continuation-in-part of Ser. No. 392,676, Aug. 11, 1989, Pat. No. 4,967,065.

[51] Int. Cl.⁵ .................. G01J 1/20; G06F 15/50
[52] U.S. Cl. .................. 250/203.6; 250/342; 244/3.16
[58] Field of Search .......... 250/203.1, 203.6, 203.3, 250/203.7, 206.1, 206.2, 211 J, 342; 356/141, 152; 244/3.16, 3.13

[56] References Cited

U.S. PATENT DOCUMENTS

| | | | |
|---|---|---|---|
| 3,076,095 | 1/1963 | Becklund et al. | 244/3.16 |
| 3,353,022 | 11/1967 | Schwartz | 250/83.3 |
| 3,557,369 | 1/1971 | Rubin | 250/203.6 |
| 3,739,175 | 6/1973 | Mabee et al. | 250/203.6 |
| 3,872,208 | 3/1975 | Hopson et al. | 250/347 |
| 3,944,167 | 3/1976 | Figler et al. | 244/3.16 |
| 4,561,611 | 12/1985 | Sinclair et al. | 244/3.16 |
| 4,703,167 | 10/1987 | Okumura et al. | 356/203 |

*Primary Examiner*—David C. Nelms
*Assistant Examiner*—Michael Messinger
*Attorney, Agent, or Firm*—Harry G. Weissenberger; Edward J. Radlo; Keith L. Zerschling

[57] ABSTRACT

The electronic simplicity of a rotating-telescope target acquisition device and the noise immunity and wide field of view of a non-rotating array device are combined in an assembly (10) using a rotating refractory telescope (21) on a gimbaled platform (28) and a combination reticle (38) and infrared detector array (34) on the same platform (28). The detector array (34) is segmented (50) to detect the direction in which a target is substantially off the telescope's optical axis (32), and the detector array (34) is also shielded (35) against any radiation coming from outside the optical path of the telescope (21). The reticle (38) also serves as the electrical connection (42,62) between the detector segments (40,50) and the contact pads (44,64) on the detector plate (36) and as a non-emitting shield against any external radiation.

6 Claims, 4 Drawing Sheets

NOISE REDUCING INFRARED RETICLE/DETECTOR ARRANGEMENT

RELATED CASES

This is a continuation-in-part of application Ser. No. 392,676 filed 11 Aug. 1989 now U.S. Pat. No. 4,967,065.

FIELD OF THE INVENTION

This invention relates to infrared target acquisition and tracking devices operating at wavelengths longer than 3.5 microns, in which the dominant noise source is the ambient background thermal radiation that the detector sees. More particularly it relates to a combined reticle and detector arrangement which provides a wider field of view and greater noise rejection.

BACKGROUND OF THE INVENTION

One type of conventional infrared target acquisition device uses a gimbaled rotating optical system with a reflective telescope whose optical axis is parallel to, but offset from, the axis of rotation of the optical system. The target image is projected onto a single cooled detector through a spoke-like reticle coaxial with the axis of rotation. The reticle is positioned on the gimbal and moves with it, but the detector is off the gimbal and stationary. Because the detector is mounted off the gimbal, it is difficult to effectively shield it from ambient thermal radiation. If the target is on the axis of rotation, the detector sees infrared radiation pulses of a constant frequency. If the target drifts off-axis, a frequency modulation becomes superimposed upon the pulses. This frequency modulation is demodulated and used to move the gimbals so as to realign the axis of rotation with the target. Similar mechanisms also exist that use an amplitude modulation reticle.

Another conventional type of target acquisition device uses a gimbaled but non-rotating optical system and an array of photodetectors (e.g. 128×128) in which the location of the target image with respect to the center of the optical axis can be electronically determined.

The rotating type of device is electronically much simpler than the array type, but it is less sensitive since it employs fewer individual detectors to cover the same field of view.

Prior art in this technology includes U.S. Pat. No. 3,353,022 to Schwartz which describes a non-tracking IR search system with a reticle separate from the detector; U.S. Pat. No. 3,872,308 to Hopson et al. which uses a light pipe approach to relay light energy from a reticle to a separate detector; U.S. Pat. No. 3,944,167 to Figler et al. which shows a multidetector reticle arrangement to sort out a target from decoys; U.S. Pat. No. 4,561,611 to Sinclair et al. which concerns a fixed target seeker for a spinning projectile in which the reticle and detector are also separate; U.S. Pat. No. 3,076,095 to Becklund in which the reticle is spaced from the detector-carrying cryogenic finger; and U.S. Pat. No. 4,703,167 to Okumura which shows a reticle placed on a visible light detector for electrical signal spectrum-shifting purposes. In all previous implementations the reticle is not cooled, and the detector views radiation either reflected or emitted from the opaque portion of the reticle.

DISCLOSURE OF THE INVENTION

The present invention combines the electronic simplicity of the rotating acquisition systems with the wide view field and noise resistance of the array systems by using a refractive telescope (21), placing the reticle (38) directly onto the surface (or at least into the cryogenic environment) of the infrared detector array (34), and shielding (35) the detector array (34) from infrared radiation outside the telescope's field of view. In addition, the invention facilitates acquisition of a target by providing around the center tracking segment (40) of the reticle/detector (34) an annulus of detector segments (50) so connected as to provide a directional indication for movement of the gimbal (14) when the target image is outside the frequency-modulating inner ring (40) of the reticle (38).

In another aspect of the invention, the reticle (38) also serves as the electrical contacts (44,64) to the detector photodiode (60). In the preferred embodiment of the invention only ten electrical leads to the detector assembly (one for the inner ring (40), eight more for the outer segment (50) annulus and a ground return) are necessary for the full functioning of the apparatus. The zigzag segmentation of the outer annular ring (50) helps suppress the chopping by large background objects.

DESCRIPTION OF THE PREFERRED EMBODIMENT

Figure 1:
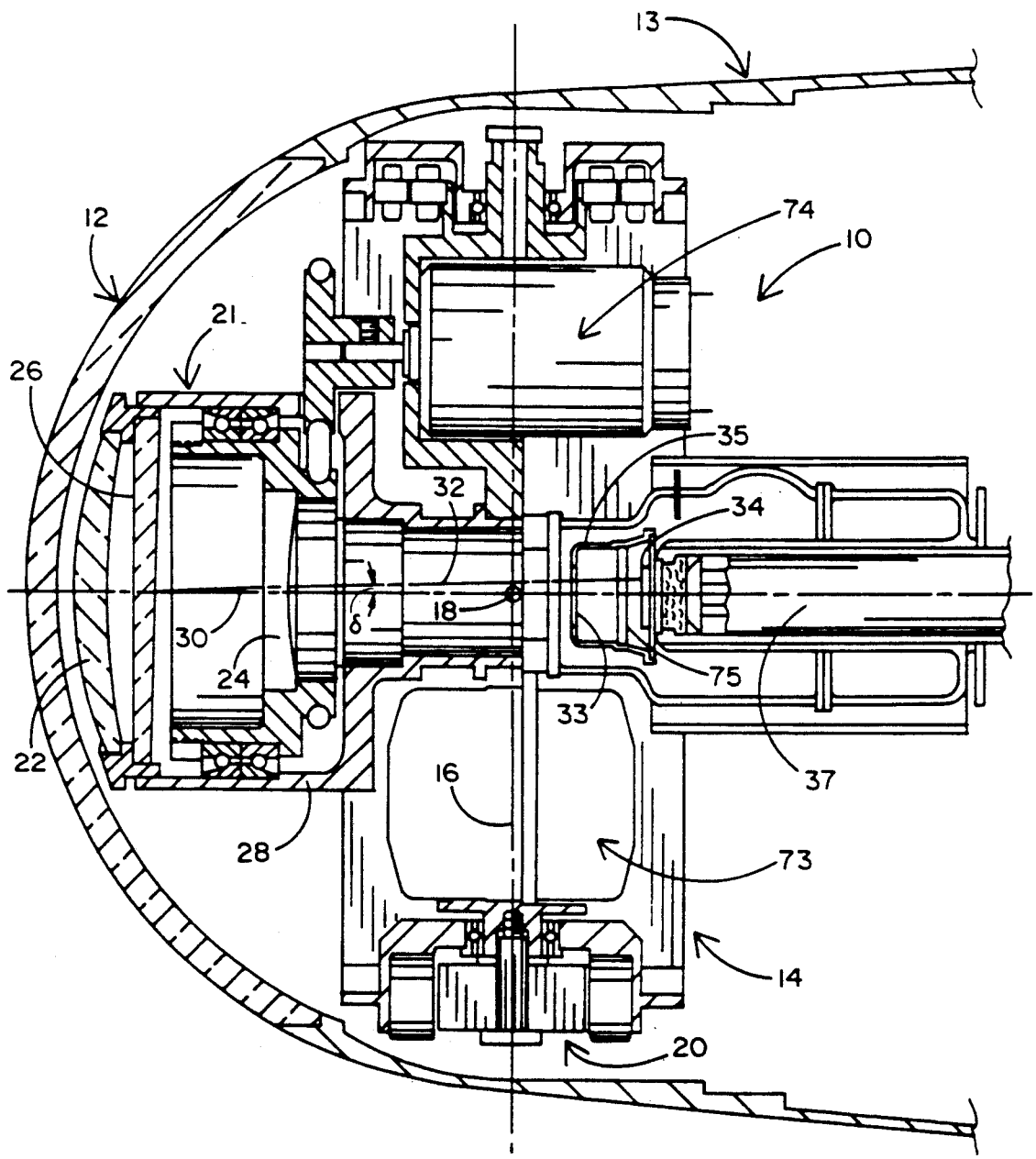
FIG. 1 is a vertical section of the assembly of this invention.

FIG. 1 shows the overall construction of the target acquisition and tracking device 10 of this invention. The device 10 is housed in a transparent dome 12 typically located in the nose 13 of a steerable airborne vehicle or missile (not shown). The device 10 is mounted in the vehicle on a conventional gimbal 14 which is pivotable about orthogonal axes 16, 18 by suitable conventional electrical drivers such as 20.

A refractive telescope 21 is composed of focusing lenses 22 and 24 which focus the target image on the detector 34, and a wedge-shaped diversion lens, 26. The field of view of telescope 21 may subtend an arc of about 45°. The lens assembly 22, 24, 26 is mounted on the gimbaled platform 28 for rotation about the platform axis 30 by a motor 31. The refractive telescope 21 has the advantage over a reflective telescope in this environment of allowing a tighter packaging of the optics for better space utilization and better shielding of the detector 34. Due to the wedge action of decentered lens 26, the optical axis 32 of the telescope 21 diverges from the platform axis 30 on the right side of lens 26 in FIG. 1 by an angle δ. A two-axis rate sensor 73 is used to stabilize the gimbal platform. The motor 74 rotates the line of sight 32 around the platform axis 30.

The infrared target image seen by the telescope 21 is projected through an aperture window 33 in a cooled (and therefore having low infrared-emitting) opaque shield 35 onto a detector 34 supported on a cryostat or dewar 37 which is mounted on the gimbaled platform 28 with the detector 34 being perpendicular to the platform axis 30. The infrared spectral response of the system is defined by a cryogenically cooled interference filter 75.

The shield 35 effectively shields the infrared detector 34 from all background or stray radiation except for that which is directly within the field of view of telescopic 21, thereby achieving considerable noise reduction. The optics and detector of this invention is intended for operation at infrared wavelengths greater than about 3.5 microns. At those wavelengths, the dominant noise source is photon impingement from the ambient background. This contrast with other infrared or visible systems which operate below 3.5 microns where the dominant noise source is inherent detector noise and is therefore largely independent of background radiation.

Figure 2:
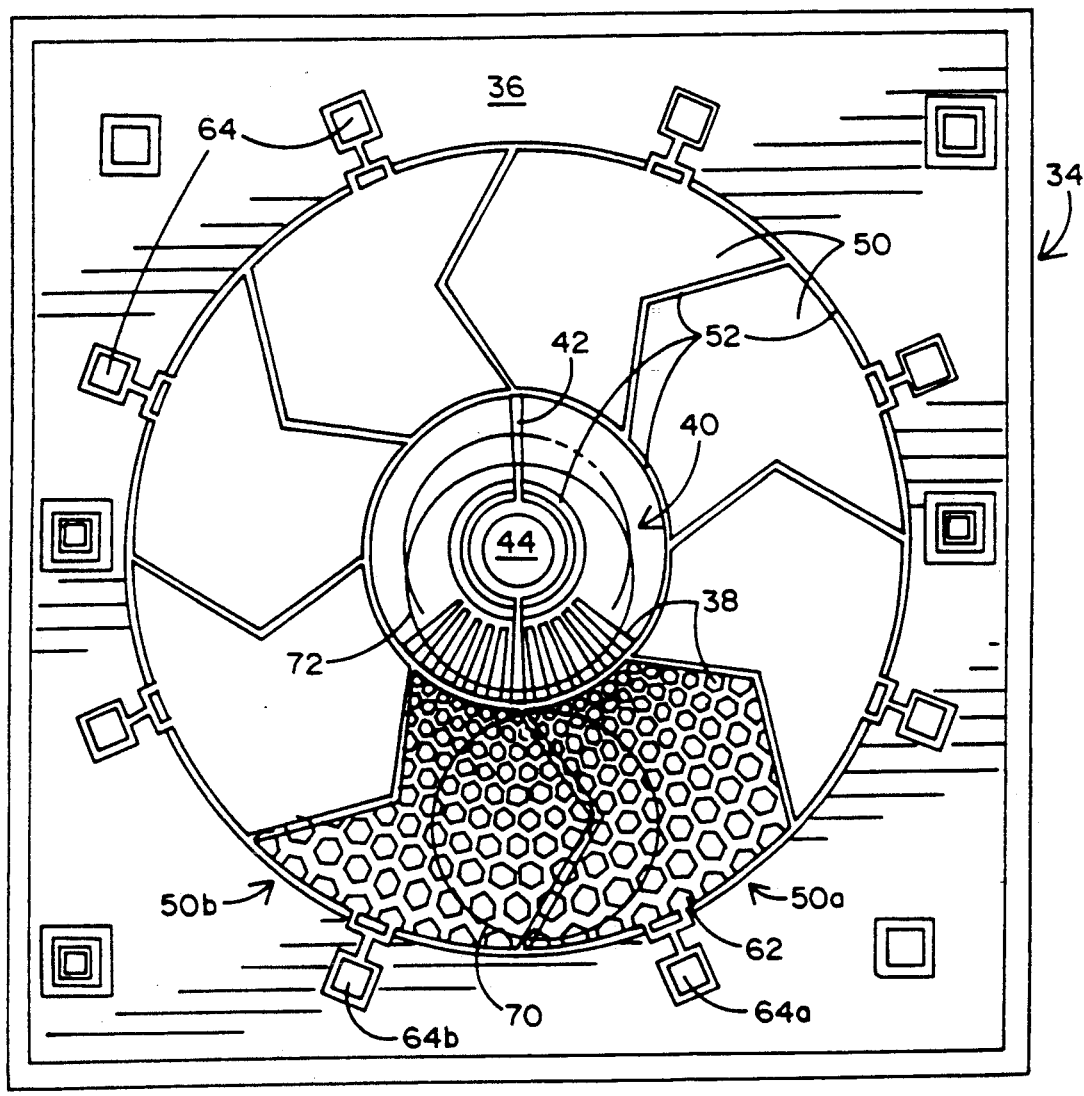
FIG. 2 is a plan view of the detector.
Figure 3:
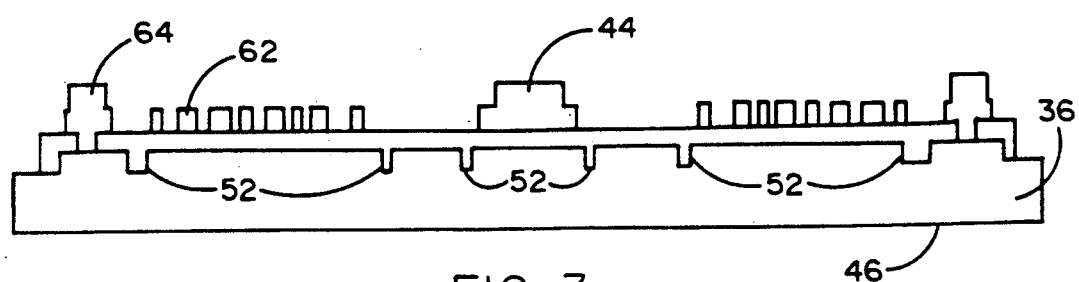
FIG. 3 is a section along line 3—3 of FIG. 2.

A preferred embodiment of the detector 34, shown in detail in FIGS. 2 and 3, consists of a single plate 36 of appropriate photovoltaic semiconductor material covered by a pattern of opaque metallic material which forms the reticle 38. Because the reticle 38 is deposited directly on the plate 36, it is cooled by the detector's cryogenic system. The metallic segments of the reticle 38 are opaque to infrared radiation, and because they are cold, they have very low emittance of infrared radiation. (If the reticle were spaced away from the detector and were not cold, its back side would radiate or reflect infrared energy of its own which would be collected by the detector). As a consequence of this reticle replacement, the ambient background radiation toward the detector 34 is thus further reduced, resulting in another substantial noise reduction. Consequently, the cooled shield 35 and the reticle 38 are highly effective at these wavelengths to reduce noise. In effect the "collecting area" of the detector is reduced by a factor of approximately 2, and consequently the noise voltage will be reduced by the square root of 2.

The pattern of reticle 38 (only a fragment of the circularly uniform pattern is shown in FIG. 2 for clarity) includes an inner ring 40 of radially extending bars. The bars and the hexagonal elements 62 are opaque; the region between the bars and the hexagonal elements 62 is transparent. One or more of the bars 42 may advantageously extend into the center of the ring 40 in order to connect to a contact pad 44. Photoelectric signals for the ring 40 appear between the contact pad 44 and the ground contact 46 (FIG. 3) of the detector plate 36.

Figure 4:
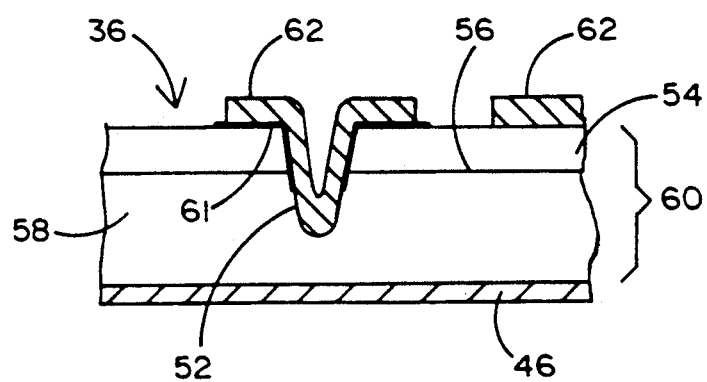
FIG. 4 is a detail section of the segment separation groove.

Surrounding the ring 40 are a number (eight in the preferred embodiment) of detector segments 50 disposed annularly around the ring 40. Each of the segments 50 is electrically isolated from its neighbors and from the ring 40 by a groove 52, best seen in FIG. 4, which cuts through the p-silicon layer 54 and the p-n junction 56 into the n-silicon layer 58 of the photodiode 60 formed within the detector plate 36. The insulation layer 61 prevents shorting of the p-n junction.

At least one of the metallic reticle elements 62 in each of the segments 50 is connected to an appropriate contact pad 64, where the photovoltaic signals generated in that sector can be collected.

In operation, let it first be assumed that the target is substantially away from the platform axis 30. In this condition, as the telescope 21 rotates about the platform axis 30, the target image may describe a circle 70 which may extend over one or (as shown) both of the segments 50a, 50b. An AC signal superimposed upon the uniform DC background radiation signal will consequently appear at contact pads 64a, 64b. The conventional gimbal electronics (not shown) use this signal to tilt the gimbaled platform 28 in a direction appropriate to move the target image toward the ring 40. Eventually, the target image circle produced by the rotation of telescope 21 reaches a position 72 wholly within the ring 40. When it does, the conventional positioning electronics (not shown) take over to further tilt the platform 28 in response to the frequency modulation caused by any eccentricity of circle 72 until the image circle 72 is concentric with the ring 40 and the frequency of the AC signal at contact pad 44 remains constant.

It will be understood that the position and line of sight rate of the platform 28 when the target has thus been acquired and tracked can be sensed by appropriate conventional electronics (not shown) and used to steer the vehicle in whatever manner may fit the situation.

Figure 5:
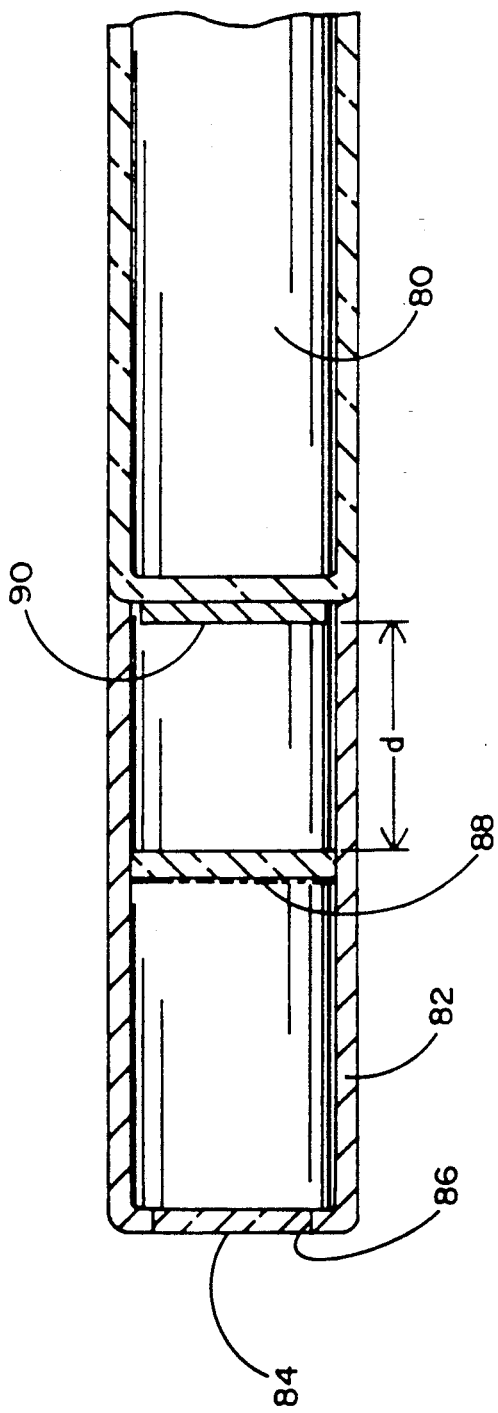
FIG. 5 is an axial section of an alternative embodiment of the reticle/detector assembly.

An alternate embodiment of the reticle-detector combination is shown in FIG. 5. In that embodiment, the cryostat 80 carries a cooled radiation shield 82 of generally cylindrical configuration. A cooled interference spectral filter 84 is positioned within the aperture 86 of the shield 82, and a cooled reticle 88 is positioned within the shield 82 near the detector 90 but spaced therefrom by a small distance d.

This arrangement allows the use of a reticle physically separated from the cooled detector (which may be more convenient) while maintaining its cooled condition, and thereby avoiding radiating spurious infrared energy toward the detector. In this approach, care must be taken as to the choice of emissivity of the cold shield 82 so that the radiation temperature in the cavity formed by 88, 82 and 90 is low, i.e. near that of the detector 90.

I claim:

1. An integrated reticle and detector assembly for tracking an infrared radiation-emitting target in an infrared target acquisition and tracking device operating substantially at wavelengths longer than 3.5 microns, comprising:
   a) a gimbaled platform having a platform axis;
   b) a telescope having an optical axis, said telescope being mounted on said platform for rotation about said platform axis, the optical axis of said telescope being spaced from said platform axis;
   c) cryogenically-cooled infrared detector means fixedly mounted on said platform to receive images from said telescope; and
   d) cooled reticle means for obscuring portions of said detector means, said reticle means being fixedly positioned with respect to said detector in the optical path of said telescope between said telescope and said detector means.

2. The assembly of claim 1, in which said reticle means are positioned on the surface of said detector means.

3. The assembly of claim 1, in which said reticle means are spaced from said detector means but positioned within the cryogenic environment of said detector means.

4. The assembly of claim 1, in which said telescope is a refractive telescope.

5. The assembly of claim 1, in which said optical axis and said platform axis are divergent.

6. The assembly of claim 1, further comprising
   e) cooled shielding means positioned around said detector means so as to shield said detector means from any infrared energy coming from outside the optical path of said telescope.

* * * * *